United States Patent
Mandalapu et al.

(10) Patent No.: US 8,482,827 B2
(45) Date of Patent: Jul. 9, 2013

(54) ANNOTATION ON MEDIA SHEET INDICATING FUNCTIONALITY TO BE PERFORMED IN RELATION TO IMAGE ON MEDIA SHEET

(75) Inventors: Dinesh Mandalapu, Karnataka (IN); Anjaneyulu Seetha Rama Kuchibhotla, Karnataka (IN); Sriganesh Madhvanath, Karnataka (IN); Deepu Vijayasenan, Valais (CH); Rama Vennelakanti, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1042 days.

(21) Appl. No.: 12/495,811

(22) Filed: Jul. 1, 2009

(65) Prior Publication Data

US 2010/0309527 A1    Dec. 9, 2010

(30) Foreign Application Priority Data

Jun. 3, 2009 (IN) .......................... 1279/CHE/2009

(51) Int. Cl.
*H04N 1/46* (2006.01)

(52) U.S. Cl.
USPC ........... 358/538; 358/505; 358/462; 358/453; 382/179; 382/176; 382/306; 382/317; 382/321

(58) Field of Classification Search
USPC ................ 358/505, 538, 403, 405, 407, 448, 358/453, 462; 382/176, 177, 179, 187, 306, 382/317, 321
See application file for complete search history.

(56) References Cited

U.S. PATENT DOCUMENTS

2006/0294450 A1* 12/2006 Barrus et al. .................. 715/500
2008/0309988 A1* 12/2008 Johnson et al. ............... 358/462

* cited by examiner

*Primary Examiner* — King Poon
*Assistant Examiner* — Jamares Q Washington

(57) ABSTRACT

A media sheet is scanned. The media sheet has an image and an annotation. The annotation indicates a functionality to be performed in relation to the image. The annotation on the media sheet as scanned is detected. The functionality to be performed in relation to the image is determined in correspondence to the annotation detected on the media sheet. The functionality to which the annotation corresponds is performed in relation to the image.

3 Claims, 7 Drawing Sheets

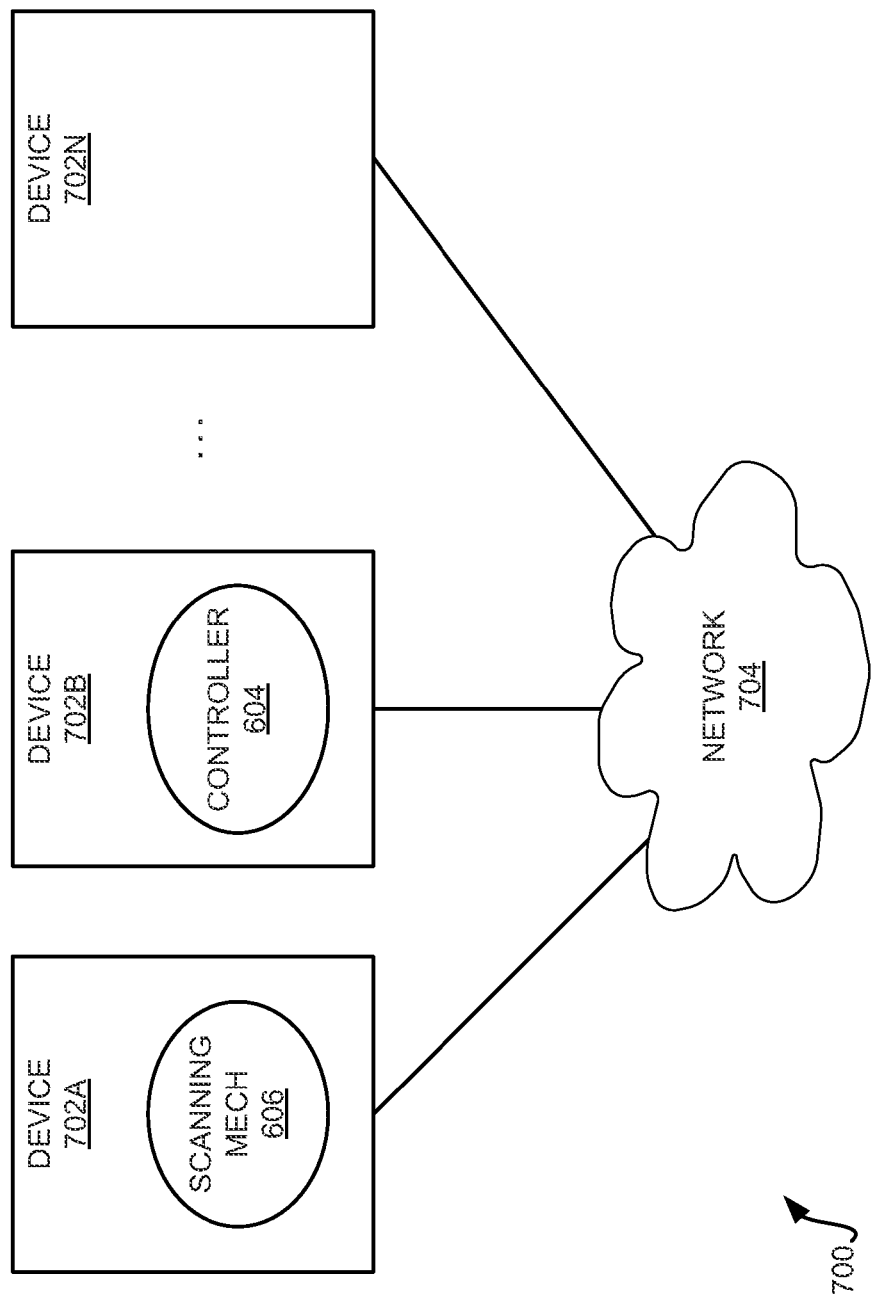

ANNOTATION ON MEDIA SHEET INDICATING FUNCTIONALITY TO BE PERFORMED IN RELATION TO IMAGE ON MEDIA SHEET

RELATED APPLICATIONS

Benefit is claimed under 35 U.S.C. 119(a)-(d) to Foreign application Serial No. 1279/CHE/2009 entitled "Annotation on media sheet indicating functionality to be performed in relation to image on media sheet" by Hewlett-Packard Development Company, L.P., filed on 3 Jun. 2009, which is herein incorporated in its entirety by reference for all purposes.

BACKGROUND

Devices known as multifunction devices (MFD's) and all-in-one (AIO) devices typically permit users to perform multiple types of functionality, such as printing and scanning, among other types of functionality like faxing. As such, users can use a single device to both print a hardcopy of a document on a sheet of media like paper, as well as scan a hardcopy of a document that has already been printed on a sheet of media in order to generate an electronic version of the document. Insofar as scanning is concerned, once a document has been scanned in, the MFD or AIO device may permit a user to save the scanned document to a storage device, to email or fax the scanned document, and/or to perform a predefined workflow in relation to the scanned document, among other types of functionalities.

BRIEF DESCRIPTION OF THE DRAWINGS

FIG. 7 is a diagram of a system, according to an embodiment of the present disclosure.

DETAILED DESCRIPTION OF THE DRAWINGS

Figure 1:
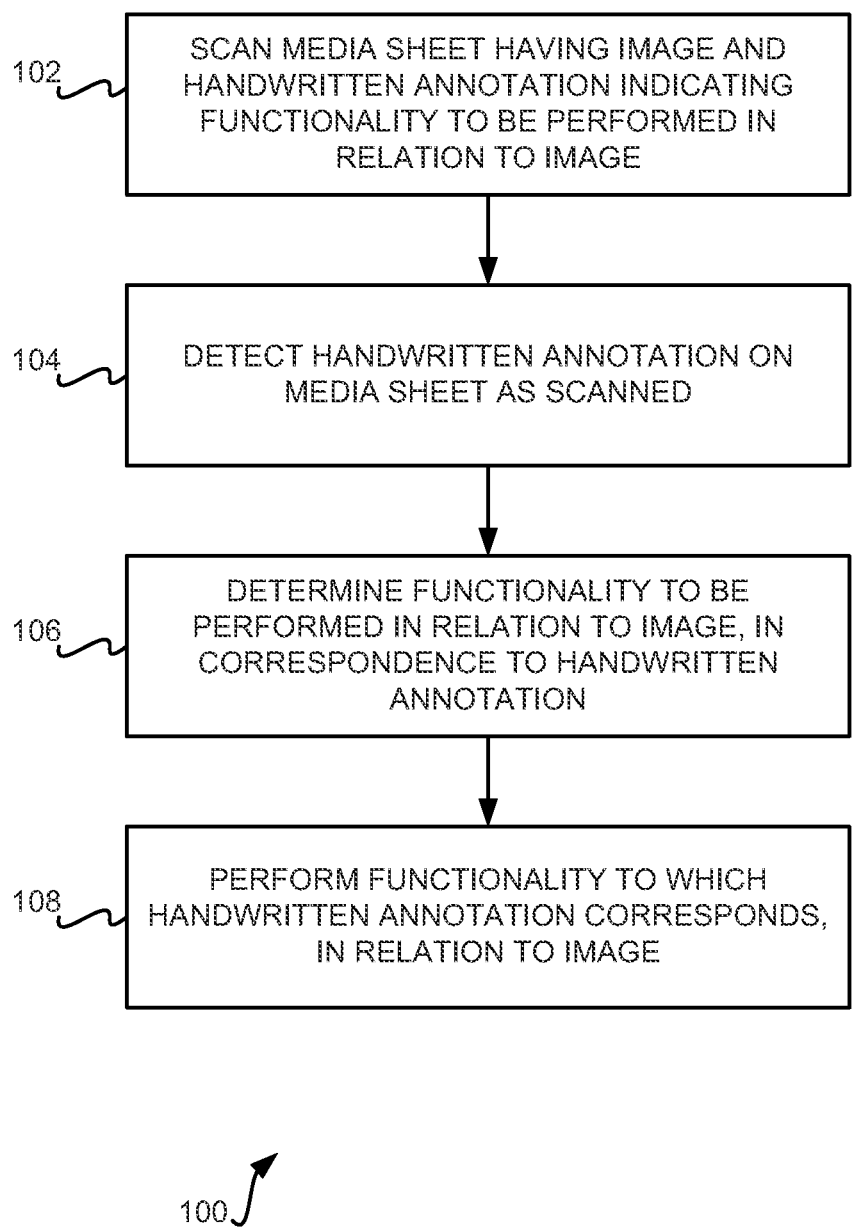
FIG. 1 is a flowchart of a method, according to an embodiment of the present disclosure.

Statement of Problem and Overview of Solution

A scanning device, or a multifunction device (MFD) or an all-in-one (AIO) device, may permit a user to scan a hardcopy of a document and save the scanned document to a storage device, email or fax the scanned document, and/or perform a predefined workflow in relation to the scanned document. To perform any of these functionalities, a user typically interacts with a control panel of the device before (or after) scanning the hardcopy of the document. For example, the user may choose the type of functionality to be performed, as well as one or more parameters associated with the functionality selected.

In the case of emailing a document, a user may enter on the control panel of the device one or more email addresses to which the document is to be emailed. Likewise, in the case of faxing a document, the user may enter on the control panel one or more fax numbers to which the document is to be faxed. In the case of saving the document to a storage device, the user may enter on the control panel the logical path of the directory of the storage device to which the document is to be saved. In the case of performing a workflow in relation to the document, the user may specify the name of the workflow that is to be performed.

In all of these situations, the user typically has to use one or more hard or soft (i.e., virtual) keys of the control panel of the device that has scanned or will scan the document. Unlike a typical computing device like a desktop or a laptop computer, however, the keys of a control panel of a scanning device, MFD, or AIO device are typically much smaller. As such, entry of information like email addresses, fax numbers, logical storage device paths, and workflow names is inconvenient for the user. Even devices that have full QWERTY keyboards may not be as easy to type on as compared to the keyboards of computing devices like desktop and laptop computers, because, for instance, they may be situated in such a way so as to require users to stand in uncomfortable positions to use their keyboards.

The inventors have invented solutions that overcome these problems. In particular, a user can simply handwrite an annotation on a media sheet, like a sheet of paper, that has an image in relation to which a given functionality, like emailing, faxing, and the like, is to be performed. When the media sheet is scanned by the device in question, the handwritten annotation is detected, and the functionality to be performed in relation to the image is determined in correspondence to this detected handwritten annotation. As such, the user does not have to enter information like email addresses, fax numbers, logical storage device paths, and workflow names using the control panel of the device. Rather, the user can simply handwrite this information on the first page of the document, along with an identifier indicating the functionality to be performed, which is then detected by the device upon scanning the document.

Methods

FIG. 1 shows a method 100, according to an embodiment of the present disclosure. All of the methods of embodiments of the disclosure, including the method 100, may be implemented at least in part as one or more computer programs having processor-executable instructions and stored on a computer-readable medium like a recordable data storage medium. As such, execution of the instructions of the programs by one or more processors results in performance of at least part of the method in question. As to the method 100, a media sheet having an image and a handwritten annotation is scanned (102). The annotation is handwritten on the media sheet, which may be a sheet of paper, by a user. The handwritten annotation indicates the functionality to be performed in relation to the image that is on the media sheet.

Figure 2:
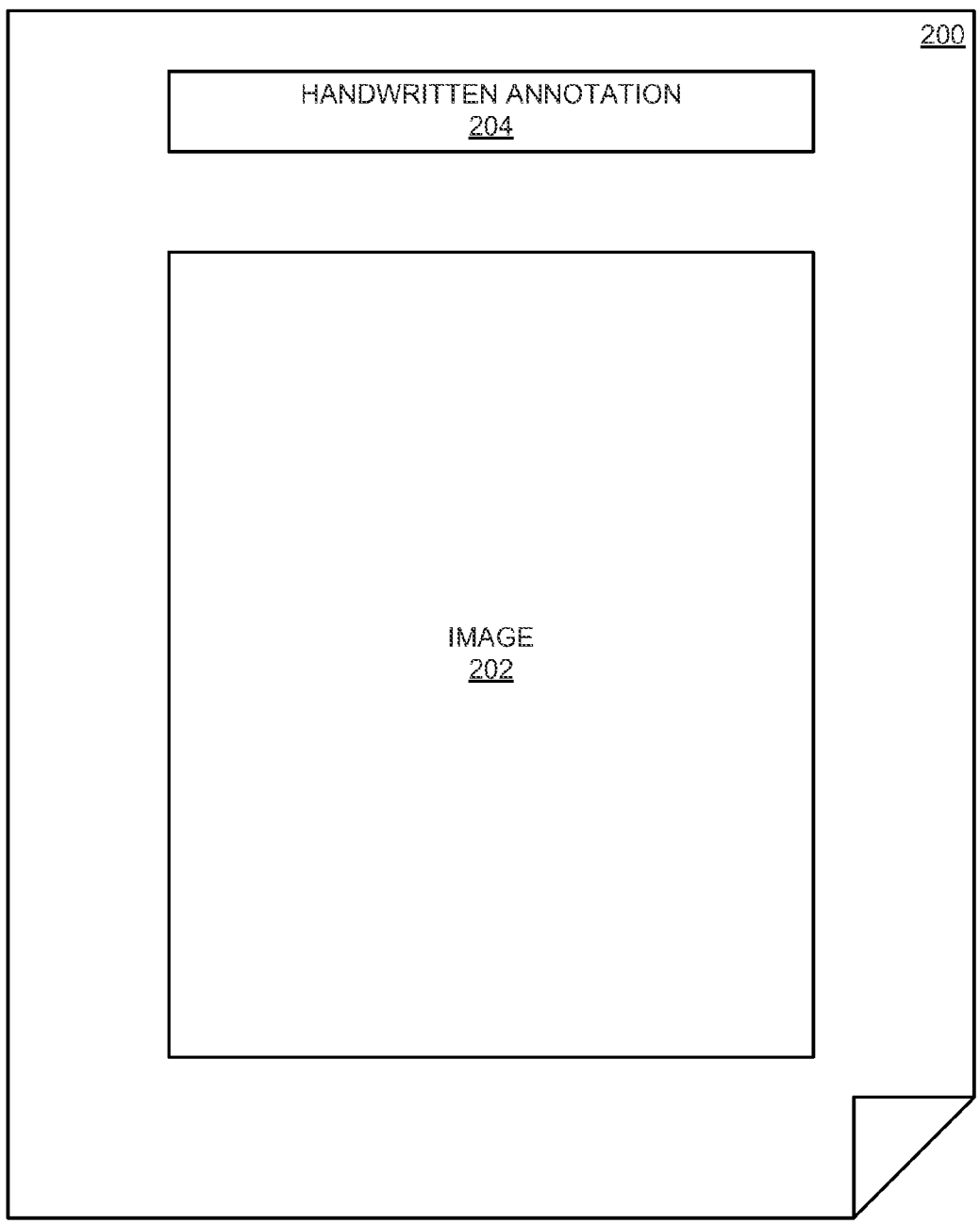
FIG. 2 is a diagram of a representative media sheet having an image and a handwritten annotation, according to an embodiment of the present disclosure.

FIG. 2 shows a representative media sheet 200 having an image 202 and a handwritten annotation 204, according to an embodiment of the disclosure. The image 202 may include text, graphics, or a combination of text and graphics. As such, the terminology "image" is used generally and in a broad sense herein, and does not specify just graphics, for instance. The image 202 may have been printed on the media sheet 200, which may be a sheet of paper, by a printing device like a laser-printing device or an inkjet-printing device. It is noted that the annotation 204 is depicted in FIG. 2 at the top of the media sheet 200, but more generally the annotation 204 can be located anywhere else on the media sheet 200, too.

The annotation 204 is handwritten on the media sheet 200 by a user. The handwritten annotation 204 indicates a functionality be performed in relation to the image 202. For example, the functionality may include emailing the image 202 to one or more email addresses. In this case, the handwritten annotation 204 may include an identifier indicating that the image is to be emailed, such as the letter E in a circle, as well as the email address to which the image 202 is to be emailed, such as in the form "name@domain.com." Alternatively, the email address may be specified by a nickname that has been previously associated with the email address and stored in an electronic address book. For instance, the email address may be specified as "Bob," where "Bob" has been previously associated as having the email address Robert@company.com As another example, the functionality may include faxing the image 202 to one or more fax numbers. In this case, the handwritten annotation 204 may include an identifier indicating that the image 202 is to be faxed, such as the letter F in a circle, as well as the fax number to which the image 202 is to be faxed, such as in the form "ABC-DEF-GHIJ" in the case of US fax numbers. Alternatively, the fax number may be specified by a nickname that has been previously associated with the fax number and stored in an electronic address book. For example, the fax number may be specified as "Bob," where "Bob" has been previously associated as having a fax number in the form "ABC-DEF-GHIJ."

As a third example, the functionality may include storing the image 202 at a location on a computer-readable medium like a hard disk drive. In this case, the handwritten annotation 204 may include an identifier indicating that the image 202 is to be stored, such as the letter S in a circle, as well as the logical location at which the image 202 is to be stored on the computer-readable medium in question, such as in the form "drive:\directory\." The user may specify the name of the electronic file that is to be stored at this location in addition to the logical location, such as in the form "drive:\directory\name.pdf." Alternatively, the logical location of the computer-readable medium may be specified by a nickname that has been previously associated with this logical location. For example, the location may be specified as "Documents," where "Documents" has been previously associated with the location "c:\documents_dir\."

As a fourth example, the functionality may include performing a predetermined workflow in relation to the image 202. In this case, the handwritten annotation 204 may include an identifier indicating that a workflow is to be performed in relation to the image 202, such as the letter W in a circle, as well as specification of the predetermined workflow that is to be performed in relation to the image 202. The workflow may be identified by a particular name, for instance, such as "incoming invoice."

In this last example, a workflow may be defined as the automatic routing of electronic documents to the users responsible for working on them. A workflow is thus concerned with providing the information required to support each step of a business process. The electronic documents may be moved over the network or maintained in a single database with the appropriate users given access to the data in question at the required times. Triggers can be implemented to alert users when required operations are overdue.

It is noted that the four examples that have been presented above are representative of the types of functionalities that can be performed as a result of handwritten annotations on media sheets. However, other embodiments can perform other types of functionalities, in addition to and/or in lieu of one or more of the four examples presented above. For instance, an example of another type of functionality that can be performed is the scaling of an image by a specified percentage. In this case, the handwritten annotation may include an identifier indicating that scaling is to be performed, such as the letters SC in a circle, followed by the specified scaling percentage, such as 75%, 125%, and so on. Other types of functionalities are also amenable to implementation in conjunction with embodiments of the present disclosure.

Referring back to FIG. 1, once the media sheet has been scanned, the handwritten annotation on the media sheet (as scanned) is detected (104). For example, in one embodiment, it may be prearranged that an annotation is to be handwritten in a predefined area of the media sheet, such as the top margin thereof, or the upper right corner thereof. In this case, the method 100 detects whether an annotation has been handwritten in the predefined area. As another example, in another embodiment, a user may be able to handwrite an annotation anywhere on the media sheet. In this case, the method 100 processes the entire scanned document to determine whether an annotation has been handwritten thereon.

The method 100 next determines the functionality to be performed in relation to the image, in correspondence to the handwritten annotation (106). It is noted that multiple functionalities may be performed, each of which may have multiple parameters. For example, an image may both be faxed to a fax number and emailed to an email address. As another example, an image may be emailed to two email addresses. As a third example, an image may be faxed to one fax number and emailed to four email addresses.

In one embodiment, optical character recognition (OCR) is performed on the handwritten annotation, to detect the identifier indicating the functionality to be performed, as well as the parameter(s) of this functionality, such as email addresses, fax numbers, logical computer-readable medium locations, workflow names, and so on. In such an embodiment, the identifier may be OCR'ed as a given letter, such as E, F, S, or W, to determine whether the image should be emailed, faxed, saved to a logical computer-readable medium location, and/or have a workflow performed in relation thereto. Likewise, the handwritten email address, fax number, logical computer-readable medium location, or workflow name is also OCR'ed.

To improve the accuracy of the OCR results, an electronic address book associated with the user that handwrote the annotation, or a global electronic address book, may be employed in part 106. For example, OCR may determine with a low degree of confidence that the email address to which the image is to be emailed is robert@conpany.com. Comparing this email address to the email addresses within the electronic address book may result in the determination that this email address is not found in the address book, but that a very similar email address, robert@company.com, is. As such, the determination process in part 106 may substitute an email address found in the electronic address book for a very similar email address resulting from performing OCR. The user may then be interactively prompted to ensure that the email address that has been selected from the address book is the correct address to which the image is to be sent.

In another embodiment, the handwritten annotation is more simply matched as a bitmap to existing bitmaps corresponding to functionalities to be performed. Thus, rather than performing OCR on the handwritten annotation "E robert@company.com" to determine that the image is to be emailed to the email address robert@company.com, a user may have previously saved his or her handwriting of "E robert@company.com" as a graphic image corresponding to the functionality of emailing robert@company.com. Alternatively, the address book entry robert@company.com may be converted to a graphic image. As such, when the user handwrites the annotation "E robert@company.com," this scanned handwritten annotation is compared to previously saved graphic images to determine that the functionality to be performed is to email robert@company.com. In this embodiment, then, OCR is not performed. As such, this approach is amenable to implementation in environments in which accurate OCR technology is unavailable.

The functionality to which the handwritten annotation corresponds, as has been determined, is then performed in relation to the image on the media sheet (108). For instance, the image may be emailed to an email address, faxed to a fax number, saved to a logical computer-readable medium location, or have a workflow performed thereon. It is noted that the image of the media sheet can include the entirety of the media sheet as scanned, except that the handwritten annotation may not be included as part of the image in relation to which the functionality in question is performed.

For example, if the image corresponds to a word processing document that has been printed on a media sheet, and if the functionality of the handwritten annotation is to fax the image to a fax number, then just the word processing document as scanned is faxed to the fax number, without including the handwritten annotation. However, in another embodiment, the handwritten annotation may be considered as part of the image, such that the handwritten annotation also has the functionality performed in relation thereto. In this embodiment, then, in relation to the previous example, the word processing document as scanned, including the handwritten annotation, is faxed to the fax number in question.

Furthermore, in one embodiment, prior to performing the functionality to which the handwritten annotation corresponds, the method 100 may confirm that the user's handwritten annotation has been interpreted properly. For example, if the functionality corresponding to the user's handwritten annotation has been determined as emailing the image on the media sheet to the email address robert@company.com, the method 100 may display this functionality to the user, and ask the user if this functionality is what the user had intended with his or her handwritten annotation. This embodiment ensures that incorrect determinations of the functionality in part 106 are not acted upon, and that the user has an opportunity to correct any inaccuracies in the determined functionality prior to the functionality actually being performed in part 108.

In many cases, a user may first print a document on one or more media sheets, before handwriting an annotation on the first media sheet to indicate a functionality to be performed in relation to all the media sheets as a common set. For example, a user may print a word processing document that has more than one page on a corresponding number of sheets of paper. All the sheets of paper thus form a common set of media sheets that are to have functionality performed in relation thereto in the same manner. For example, a user may handwrite an annotation on the first sheet of paper indicating that the images on all the sheets of paper are to be faxed to a given fax number.

Figure 3:
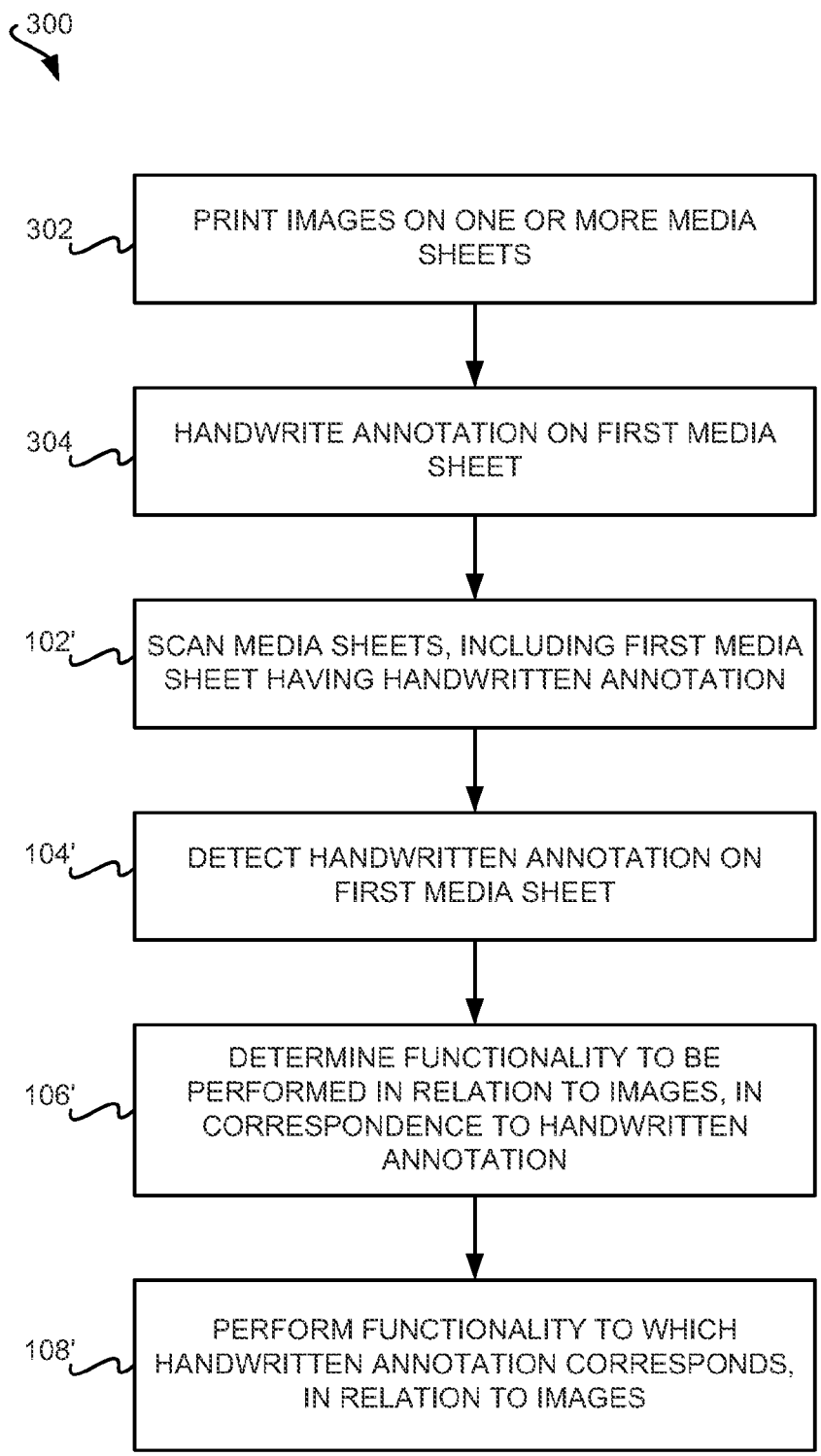
FIG. 3 is a flowchart of a method that is more detailed than but consistent with the method of FIG. 1, according to an embodiment of the present disclosure.

FIG. 3 shows a method 300, according to such an embodiment of the disclosure, which is consistent with but more detailed than the method 100 of FIG. 1. Similar parts in FIG. 3 as compared to FIG. 1 are indicated by the same reference number in FIG. 3 as in FIG. 1, but with the addition of a prime symbol (i.e., a single apostrophe). Images may be printed on one or more media sheets by using a printing device (302), like a laser-printing device or an inkjet-printing device. As noted above, the terminology "image" is inclusive of text, graphics, or a combination of text and graphics. The images on the media sheets may alternatively be generated in a manner other than printing.

A user handwrites an annotation on the first media sheet (304). The handwritten annotation indicates the functionality that is to be performed in relation to the images on all the media sheets as a common media sheet set. The media sheets, including the first media sheet having the handwritten annotation, are then scanned (102'). The handwritten annotation on the first media sheet is detected (104'), as has been described above, and the functionality to be performed in relation to the images is determined in correspondence to the handwritten annotation (106'), as has also been described above. Finally, the functionality to which the handwritten annotation on the first media sheet corresponds, as has been determined, is performed in relation to the images on all the media sheets as scanned (108').

Annotation Customization

Figure 4:
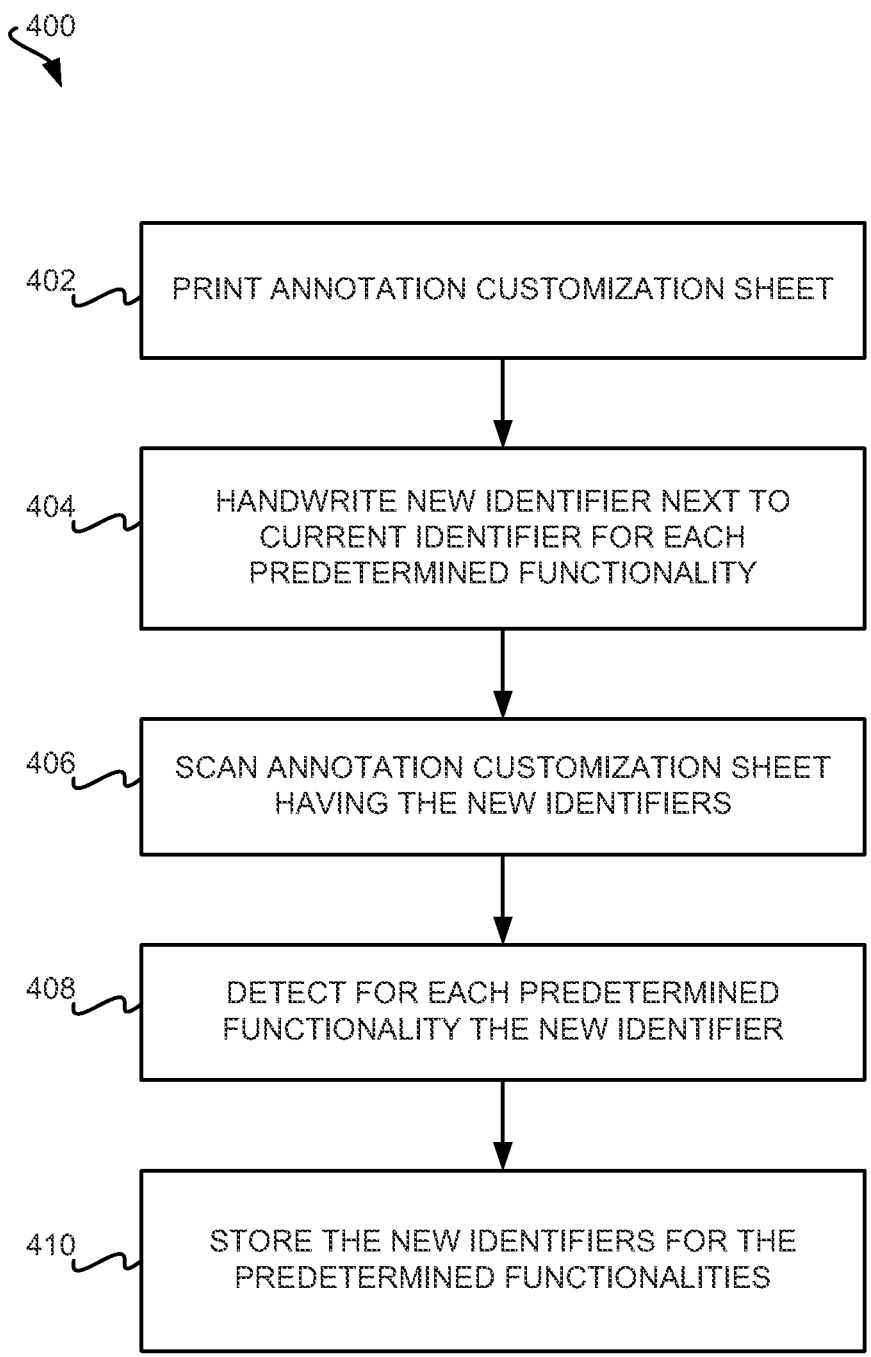
FIG. 4 is a flowchart of a method to customize handwritten annotations, according to an embodiment of the present disclosure.

FIG. 4 shows a method 400 to customize the annotations that a user handwrites on a media sheet to have corresponding functionalities performed in relation to the media sheet, according to an embodiment of the disclosure. An annotation customization sheet is first printed (402), such as by using a printing device like a laser-printing device or an inkjet-printing device. A user then handwrites a new (i.e., a customized) identifier next to the current identifier on the annotation customization sheet for each functionality (404).

Figure 5:
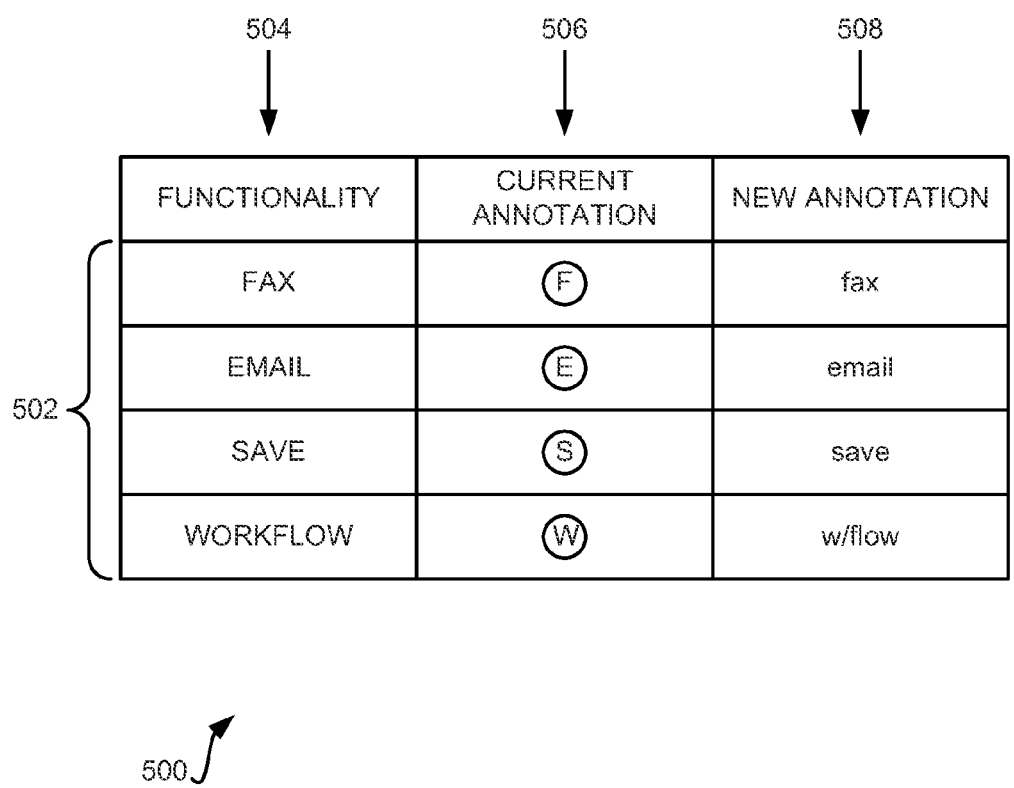
FIG. 5 is a diagram of a representative annotation customization sheet, according to an embodiment of the present disclosure.

FIG. 5 shows a representative annotation customization table 500 that may be printed on an annotation customization sheet in part 402, as handwritten on by a user in part 404, according to an embodiment of the disclosure. The customization table 500 includes a number of rows 502 corresponding to the different functionalities that can be performed in relation to an image on a media sheet. For each row 504, the column 502 particularly identifies the functionality, the column 506 identifies the current identifier corresponding to the functionality, and the column 508 provides space where a user handwrites a new identifier for the functionality.

For example, as to fax functionality, the current identifier may be the letter "F" within a circle. The user, however, may instead wish to have as a new identifier the word "fax" in lowercase. Likewise, the current identifier for email functionality may be a circled letter "E," whereas the user may instead wish to have as a new identifier the word "email" in lowercase. The current identifier for saving to a location on a computer-readable medium may be the letter "S" within a circle, whereas the user may instead wish to have as a new identifier the word "save" in lowercase. Finally, the current identifier for performing a workflow may be the letter "W" within a circle, whereas the user may instead wish to have as a new identifier the term "w/flow" in lowercase.

Referring back to FIG. 4, once the user has handwritten new identifiers next to the current identifier for each predetermined functionality, the annotation customization sheet with the new handwritten identifiers is scanned (406). The new identifier for each predetermined functionality is detected (408), and stored for subsequent usage (410). The detection process in part 408 may include performing optical character recognition (OCR) on each new identifier, or simply saving each new identifier as a bitmap.

The new identifiers may be stored in part 410 as a profile that is particular to the user that handwrote the new identifiers, which is then subsequently used in the methods 100 and 300 of FIGS. 1 and 3 when this user scans in a media sheet having an image and a handwritten annotation to determine the functionality that is to be performed on the image in correspondence with the annotation. Alternatively, the new identifiers may be stored in part 410 as a public profile that can be used by any user, or may be stored in part 410 as a profile that is particular to a group of users. A user may have one or more profiles, too. Alternatively still, the new identifiers may be stored in 410 as overriding the current annotations that were printed on the annotation customization sheet.

Furthermore, the annotation customization sheet may be employed as a way to train the recognition process that is performed in parts 106 and 106' of FIGS. 1 and 3 to determine the functionality to which a handwritten annotation corresponds. For example, the user may handwrite as the new identifier in column 508 the exact current identifier specified in column 506 of FIG. 5 for the functionality of each row 502. As such, scanning in the handwritten new identifiers in part 406 and detecting these new identifiers in part 408 can aid the recognition process of subsequently handwritten annotations on media sheets having images. This is because the determination process of parts 106 and 106' of FIGS. 1 and 3 now has a baseline bitmap as to how a particular user handwrites a circled letter "F," a circled letter "E," and so on.

In any case, after the annotation customization process of FIG. 4 has been performed, part 106 of the method 100 and part 106' of the method 300 are performed the next time as follows. Particularly, the identifier of the handwritten annotation on the media sheet having the image that is scanned in parts 102 and 102' is matched to one of the new identifiers that the user handwrote on the annotation customization sheet. Thus, the functionality that is performed in relation to the image on the media sheet that is scanned in parts 102 and 102' is the predetermined functionality corresponding to the new identifier that the handwritten annotation matches.

Customizing the identifiers that correspond to the predetermined functionalities is useful, because different users may have different mnemonics for remembering the functionalities. The new identifiers that a given user handwrites on the annotation customization sheet may be stored as a profile for the user on the scanning device, multifunction device (MFD), or all-in-one (AIO) device that performs the scanning in the methods 100 and 300. The profile may be recalled when the user logs onto the device. Alternatively, the profile may be stored on a remote server device, or on a removable computer-readable medium, such as a flash drive or thumb drive.

Furthermore, the identifiers that correspond to the predetermined functionalities may be customized by entering the new identifiers in a way other than as has been described. For example, a given device may have a touch-sensitive surface, like a touch-sensitive screen. As such, the user may enter a new identifier for each predetermined functionality by using a stylus or a finger to handwrite the new identifier on the touch-sensitive surface of the device.

Implementation Embodiments

Figure 6:
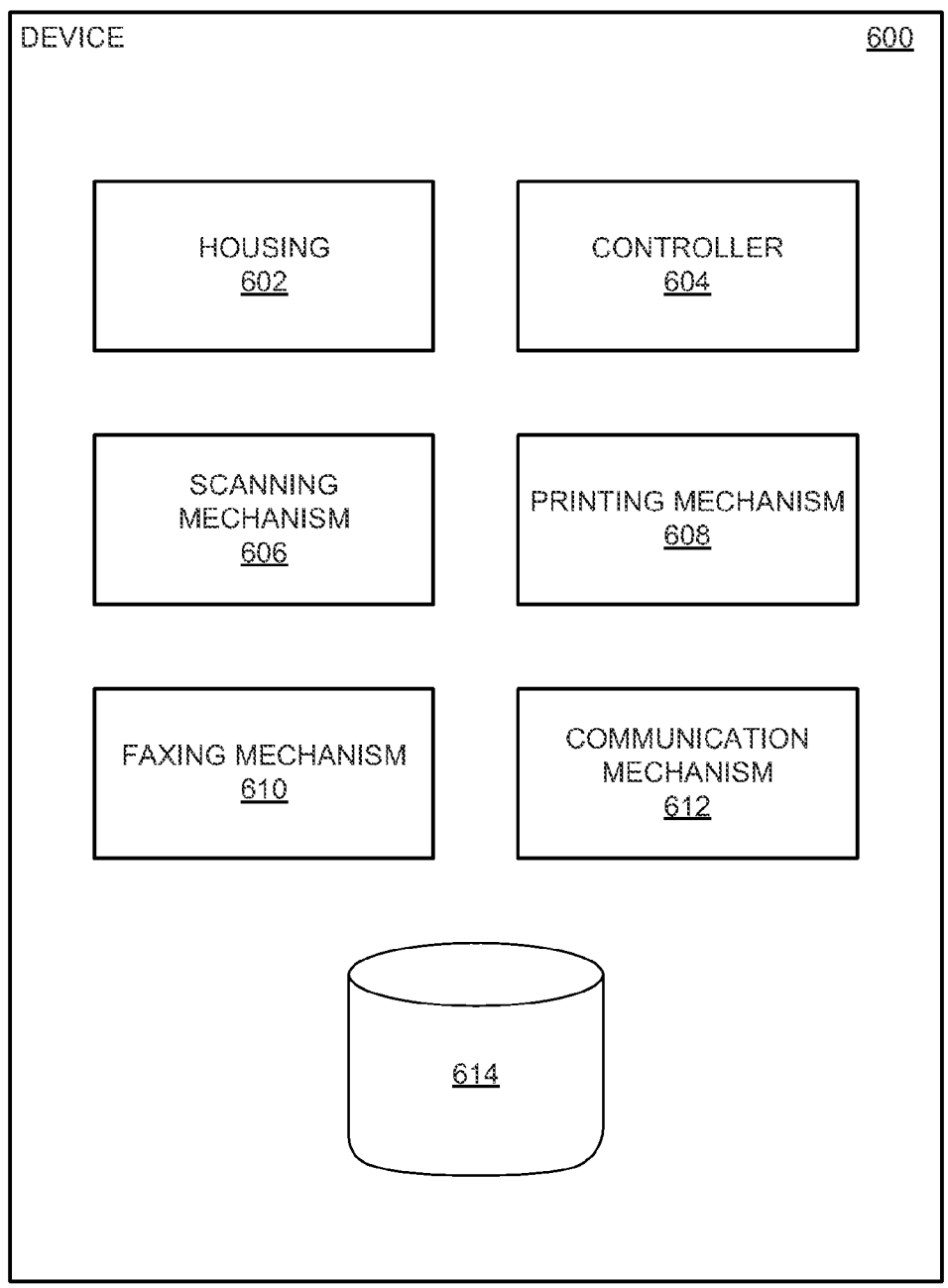
FIG. 6 is a diagram of a device, according to an embodiment of the present disclosure.

FIG. 6 shows how an embodiment of the present disclosure can be implemented within a single device 600, such as a multifunction device (MFD) or an all-in-one (AIO) device. The device 600 includes a housing 602, in which one or more of a controller 604, a scanning mechanism 606, a printing mechanism 608, a faxing mechanism 610, a communication mechanism 612, and a computer-readable medium 614 are at least partially disposed. The controller 604 and the mechanisms 606, 608, 610, and 612 are each implemented at least via hardware, and may further be implemented as a combination of hardware and software. The device 600 may include other components, in addition to and/or in lieu of those depicted in FIG. 6, such as control panels, touch-sensitive surfaces, and so on. Furthermore, not all the components depicted in FIG. 6 necessarily have to be present in every embodiment of the device 600.

The scanning mechanism 606 scans a media sheet having an image and a handwritten annotation to generate an electronic version of the image and the handwritten annotation. As has been described above, the handwritten annotation indicates a functionality to be performed in relation to the image. The controller 604 detects the handwritten annotation on the media sheet as scanned, determines the functionality in correspondence to the handwritten annotation, and performs the functionality in relation to the image.

For example, where the functionality is emailing the image to an email address, the controller 604 causes the communication mechanism 612, which may be communicatively coupled to a network over which email can be sent, such as the Internet, to email the image to the email address. It is noted in this respect that the device 600 may already have such email functionality built-in and that is ordinarily access via a control panel, such that this embodiment may be considered as simply leveraging this existing functionality in a way that does not use the control panel. Alternatively, the communication mechanism 612 may be communicatively coupled to a host device, like a host computing device such as a desktop, laptop, or server computer. In this case, the controller 604 may cause the communication mechanism 614 to send the image and the email address to the host computing device, which itself then emails the image to the email address.

As another example, where the functionality is faxing the image to a fax number, the controller 604 causes the faxing mechanism 610 to fax the image to the fax number. As such, the faxing mechanism 610 may be communicatively coupled to a telephone network, such as a public switched telephone network (PSTN). It is also noted in this respect that the device 600 may already have such faxing functionality built-in and that is ordinarily accessed via a control panel, such that this embodiment may be considered as simply leveraging this existing functionality in a way that does not use the control panel. Alternatively, the faxing mechanism 610 may be the same mechanism as the communication mechanism 612, and where communicatively coupled to a network over which email can be sent, may fax the image to the fax number using an Internet fax service over email. Alternatively still, where the mechanisms 610 and 612 are the same mechanism, and where communicatively coupled to a host computing device, may cause the host computing device itself to fax the image to the fax number using an Internet fax service over email. Other manners by which fax functionality can be performed are also possible.

As a third example, the functionality may be electronically storing the image at a location on a computer-readable medium. Where the computer-readable medium in question is the local computer-readable medium 614 of the device 600, the controller 604 electronically stores the image on the medium 614. Where the computer-readable medium in question is a remote computer-readable medium external to the device 600, the controller 604 may cause the communication mechanism 612 to have the image electronically stored on the remote medium. The remote computer-readable medium may be a storage device of a host computing device, a network-attached storage (NAS), a storage-area or -array network (SAN), or another type of computer-readable medium. Here, too, the device 600 may already have such electronic storage functionality built-in and that is ordinarily accessed via a control panel, such that this embodiment may be considered as simply leveraging this existing functionality in a way that does not use the control panel.

As a fourth example, the functionality may be performing a workflow in relation to the image. The controller 604 may be able to initiate performance of the workflow in relation to the image itself. In this respect as well, the device 600 may already have such workflow performance functionality built-in and that is ordinarily accessed via a control panel, such that this embodiment may be considered as simply leveraging this existing functionality in a way that does not use the control panel. Alternatively, the controller 604 may cause the communication mechanism 612 to send the image to a host computing device, such as a server computing device, which itself may initiate performance of or completely perform the workflow in relation to the image. It is noted that workflow commands may be configured, and destinations or parameters to which the workflow commands correspond may be mapped, based on the preferences of the organization that is using the device 600. An example of such a command is to execute an application, in which the image is passed to the application, and where the identity of the application is considered a destination or parameter of the command in question.

As has been described, the various functionalities that can be performed may be built into the device 600 already, but which are ordinarily accessed via a control panel, such that embodiments of the disclosure leverage these existing functionalities in a way that does not use the control panel. These functionalities may be predefined within the device 600 such that no customization is needed in order to use them. However, some types of functionalities may be customized by using external software in conjunction with the device 600, or via the device 600 itself. For instance, as noted in the previous paragraph, workflow commands may be configured and destinations or parameters to which these commands correspond may be mapped based on organizational preferences. Such configuration and mapping may be accomplished via such external software, or via the device 600 itself in some embodiments.

Furthermore, the printing mechanism 608 is capable of printing images on media sheets such as sheets of paper. As such, the printing mechanism 608 may print an annotation customization sheet, as has been described above. In this case, after a user has handwritten new identifiers for the predetermined functionalities listed on the annotation customization sheet, the scanning mechanism 606 scans the sheet, and the controller 604 detects the new handwritten identifiers for the functionalities, as has also been described above. The controller 604 may store the new identifiers as a profile on the computer-readable medium 614. The medium 614 may be a fixed storage device, such as a hard disk drive, or a removable storage device, such as a flash drive or thumb drive.

In the embodiment of FIG. 6, then, the handwritten annotation behavior of the present disclosure is implemented within a single device 600. However, in another embodiment, the handwritten annotation behavior of the present disclosure may be implemented over a number of different hardware devices. FIG. 7 shows a system 700 according to such an embodiment of the disclosure.

In FIG. 7, there are a number of hardware devices 702A, 702B, . . . , 702N, collectively referred to as the hardware devices 702, which are communicatively interconnected to one another over a network 704. Each of the hardware devices 702 in FIG. 7 is a separate, discrete hardware device. As such, each hardware device has its own separate housing in which the components thereof are at least partially disposed, as has been described in relation to FIG. 6 with respect to the housing 602 of the device 600. The network 704 may be one or more of the Internet, an intranet, an extranet, a local-area network (LAN), a wide-area network (WAN), as well as other types of networks.

In FIG. 7, the scanning mechanism 606 is depicted as being at least partially disposed within the hardware device 702A, whereas the controller 604 is depicted as being at least partially disposed within the hardware device 702B. In general, each hardware device 700 may have memory, processors, and other types of components. Furthermore, the hardware devices 700 may each be a printing device, an MFD or an AIO device, a scanning device, a computing device like a desktop, laptop, or server computer, and/or another type of device.

Thus, in the implementation of FIG. 7, the hardware device 702A scans a media sheet having an image and a handwritten annotation to generate an electronic version of the image and the handwritten annotation, as has been described, due to the device 702A including the scanning mechanism 606. However, it is the hardware device 702B that detects the handwritten annotation on the media sheet as scanned, that determines functionality in correspondence to the handwritten annotation detected on the media sheet as scanned, and that performs the functionality in relation to the image on the media sheet as scanned, as has been described. This is because the device 702B includes the controller 604.

Therefore, FIG. 7 representatively and exemplarily depicts how the described handwritten annotation behavior of the present disclosure can be implemented in a distributed manner over a number of hardware devices 702, as opposed to in a single device 600 as in FIG. 6. However, the actual manner by which the handwritten annotation behavior is implemented in a distributed manner over a number of hardware devices is not limited to the exemplary embodiment of FIG. 7. Rather, FIG. 7 shows just a single distributed manner by which this behavior can be implemented.

Overall, then, embodiments of the present disclosure have been presented in which a user can annotate a media sheet in a handwritten manner so that the image on the media sheet has desired functionality performed in relation thereto after being scanned. The user does not have to use a control panel of a device to cause this functionality to be performed. As such, the functionality can be caused to be performed in a more convenient and easier manner by the user.

Additional Embodiments

Embodiments of the present disclosure have been described in relation to a media sheet having an image and an annotation that is handwritten on the media sheet. The annotation may in another embodiment be printed on the media sheet, however, at the same time that the image is printed on the media sheet, or at a different time. The annotation may be stamped on the media sheet as well. In general, then, the media sheet can have an annotation in that the annotation may be formed on the sheet in any of a number of different ways that is not limited by embodiments of the present disclosure.

As another example, a self-adhesive note, also referred to as a sticky note and available under the trademark Post-It® note from 3M of Maplewood, Minn., may be affixed to the media sheet. The self-adhesive note includes the annotation in this example, and the annotation may be formed on the self-adhesive note before or after the note is affixed to the media sheet. It is still said and considered, however, that the media sheet has the annotation, because the self-adhesive note on which the annotation is formed is affixed to the media sheet prior to the media sheet being scanned. That is, at least from the perspective of scanning the media sheet, the media sheet has the annotation, insofar as the annotation is scanned with the image on the media sheet as if the annotation were formed on the media sheet itself. The self-adhesive note may be affixed to the media sheet so that the note desirably does not block the image on the media sheet, so that the image can be completely scanned.

As a third example, an at least partially transparent sheet, an example of which is known as a transparency sheet or simply as a transparency, may be overlaid over the media sheet. The at least partially transparent sheet includes the annotation in this example, and the annotation may be formed on this sheet before or after it is affixed to the media sheet. It is still said and considered, however, that the media sheet has the annotation, because the at least partially transparent sheet on which the annotation is formed is overlaid onto the media sheet prior to the media sheet being scanned. That is, at least from the perspective of scanning the media sheet, the media sheet has the annotation, insofar as the annotation is scanned with the image on the media sheet as if the annotation were formed on the media sheet itself. The transparency sheet may be overlaid onto the media sheet so that the annotation formed on the transparency sheet desirably does not block the image on the media sheet, so that the image can be completely scanned.

We claim:

1. A device comprising:
    a housing;
    a scanning mechanism at least partially disposed in the housing to scan a media sheet having an image and an annotation to generate an electronic version of the image and the annotation, the annotation indicating a functionality to be performed in relation to the image; and,
    a controller at least partially disposed in the housing to detect the annotation on the media sheet as scanned by the scanning mechanism, to determine the functionality in correspondence to the annotation detected on the media sheet, and to perform the functionality in relation to the image; and
        a printing mechanism at least partially disposed within the housing, the printing mechanism to print an annotation customization sheet listing a plurality of predetermined functionalities that are capable of being performed in relation to the image of the media sheet, the annotation customization sheet further listing a plurality of current identifiers corresponding to the predetermined functionalities,
        the scanning mechanism further to scan the annotation customization sheet after a user has a new identifier next to the current identifier on the annotation customization sheet for each predetermined functionality,
        the controller further to detect for each predetermined functionality the new identifier by the user, and is further to store the new identifiers for the predetermined functionalities as a profile on a computer-readable medium.

2. The device of claim 1, wherein the functionality comprises one or more of:
    emailing the image to an email address, such that the annotation has an identifier indicating that the image is to be emailed, the annotation also having the email address to which the image is to be emailed;
    faxing the image to a fax number, such that the annotation has an identifier indicating that the image is to be faxed, the annotation also having the fax number to which the image is to be faxed;
    storing the image at a location on a computer-readable medium, such that the annotation has an identifier indicating that the image is to be stored, the annotation also having the location at which the image is to be stored on the computer-readable medium;
    performing a predetermined workflow in relation to the image, such that the annotation has an identifier indicating that a workflow is to be performed in relation to the image, the annotation also specifying the predetermined workflow to be performed in relation to the image.

3. The device of claim 1, wherein the annotation has an identifier corresponding to the functionality to be performed in relation to the image, the identifier being a customized identifier previously by the user.

* * * * *